(12) United States Patent
Yee

(10) Patent No.: US 7,263,039 B2
(45) Date of Patent: Aug. 28, 2007

(54) MICRO-ACTUATOR, MANUFACTURING METHOD THEREOF, OPTICAL PICKUP HEAD OF OPTICAL RECORDING/REPRODUCING APPARATUS WITH MICRO-ACTUATOR AND MANUFACTURING METHOD THEREOF

(75) Inventor: Young Joo Yee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 630 days.

(21) Appl. No.: 10/636,576

(22) Filed: Aug. 8, 2003

(65) Prior Publication Data

US 2004/0032814 A1    Feb. 19, 2004

(30) Foreign Application Priority Data

| Aug. 13, 2002 | (KR) | ...... 10-2002-0047824 |
| Sep. 18, 2002 | (KR) | ...... 10-2002-0057058 |
| Dec. 20, 2002 | (KR) | ...... 10-2002-0081866 |

(51) Int. Cl.
  *G11B 7/00* (2006.01)
(52) U.S. Cl. ................ 369/44.14; 369/44.15
(58) Field of Classification Search ........... 369/44.14, 369/44.15
  See application file for complete search history.

(56) References Cited

U.S. PATENT DOCUMENTS

| 4,937,808 | A | * | 6/1990 | Shimada et al. ....... 369/112.24 |
| 5,497,359 | A | | 3/1996 | Mamin et al. .......... 369/44.15 |
| 5,828,644 | A | | 10/1998 | Gage et al. ............ 369/112 |
| 6,167,016 | A | * | 12/2000 | Block et al. .......... 369/13.13 |
| 6,324,130 | B1 | * | 11/2001 | Hatam-Tabrizi et al. . 369/13.17 |
| 6,360,035 | B1 | | 3/2002 | Hurst, Jr. et al. |
| 6,434,088 | B1 | * | 8/2002 | Ishizaki et al. ......... 369/13.33 |
| 6,657,942 | B2 | * | 12/2003 | Lee et al. ............. 369/112.24 |
| 6,661,617 | B1 | | 12/2003 | Hipwell, Jr. et al. .... 360/294.4 |
| 6,781,926 | B2 | * | 8/2004 | Ishizaki et al. ......... 369/13.13 |
| 6,970,400 | B1 | * | 11/2005 | Wakabayashi et al. .... 369/13.2 |
| 2001/0008457 | A1 | | 7/2001 | Zhang |
| 2002/0026831 | A1 | | 3/2002 | Behin Behrang et al. |

FOREIGN PATENT DOCUMENTS

| CN | 1319843 | 10/2001 |
| EP | 1265232 | 12/2002 |
| JP | 05-224751 | 9/1993 |
| JP | 06160750 | 7/1994 |
| WO | WO99/37013 A | 7/1999 |
| WO | WO 01/45098 A1 | 6/2001 |
| WO | WO 01/52399 A | 7/2001 |
| WO | WO 01/73935 A | 10/2001 |
| WO | WO 01/74707 A2 | 10/2001 |
| WO | WO 03/086954 A | 10/2003 |

\* cited by examiner

*Primary Examiner*—Wayne Young
*Assistant Examiner*—Van T. Pham
(74) *Attorney, Agent, or Firm*—KED & Associates, LLP

(57) ABSTRACT

A micro-actuator, its manufacturing method, an optical pickup head of an optical recording/reproducing apparatus having the micro-actuator, and its manufacturing method are disclosed. A low voltage and low power bi-directional driving is accomplished so that a size and a weight of a system can be considerably reduced and a response speed can be improved. A uniformity and a production efficiency are heightened by reducing a alignment tolerance. In addition, a configuration tolerance caused due to an uneven thickness of a protection layer of the record layer on the disk and an uneven smoothness of the disk is corrected, so that a focal point of an objective lens can be optimally made on a record layer of the disk.

6 Claims, 13 Drawing Sheets

(a)      (b)

(a)      (b)

(a)      (b)

(a)      (b)

(a)      (b)

(a)      (b)

MICRO-ACTUATOR, MANUFACTURING METHOD THEREOF, OPTICAL PICKUP HEAD OF OPTICAL RECORDING/REPRODUCING APPARATUS WITH MICRO-ACTUATOR AND MANUFACTURING METHOD THEREOF

BACKGROUND OF THE INVENTION

1. Field of the Invention

The present invention relates to a micro-actuator, its manufacturing method, an optical pickup head of an optical recording/reproducing apparatus having the micro-actuator, and its manufacturing method, and more particularly, to a micro-actuator which can be bi-directionally driven, an optical pickup head of an optical recording/reproducing apparatus which can focus a focal point of an objective lens optimally on a record layer by using the bi-directional micro-actuator, and its manufacturing method.

2. Description of the Background Art

With the MEMS (Micro Electro Mechanical System) technologies advancing, a technique of design, manufacturing and application of a microstructure, a ultra-micro actuator, various ultra-micro sensors, micro optical parts, micro fluid device or the like, which was hard to be realized in the past, has been developed and commercialized.

In case of a comb-type micro-actuator using various metals such as a polycrystalline silicon, a single crystalline silicon, aluminum or nickel, a static electricity force generated from close side wall surfaces of comb fingers (comb type electrodes) is used as a driving force of the microstructure. The static electricity force has such characteristics that only attraction works between two electrodes charged by a difference in applied voltages, so the driving force of the micro-actuator is uni-directional.

Therefore, in the case of the micro-actuator, only the uni-directional driving is used, and in case where a bi-directional driving is required, the micro-actuator is disposed at both sides, which, however, results in increase of the size and weight of a system adopting the micro-actuator and degradation of response speed.

Consequently, a technique related to the bi-directional driving of the micro-actuator is in urgent need of developing.

Recently, popularization of a personal computer and generalization of a data transmission network and a mobile communication device such as personal information terminal according to advancement of a multimedia environment accompany requirement of a considerable increase in a capacity of information to be processed and stored in those devices.

In order to cope with the situation, researches are ongoing to increase a record density of an optical recording medium such as a CD or a DVD, increase a resolution of an optical pickup device, and implement small optical components.

One of the optical pickup device satisfying the requirement of the ultra-compact high density optical recording/reproducing apparatus is a slide type optical pickup head which is able to record a data on or reproduce and search a data from an optical disk.

The optical recording/reproducing apparatus and its optical pickup head will now be described with reference to FIGS. 1 and 2.

FIG. 1 is a plan view of an optical recording/reproducing apparatus in accordance with a conventional art, and FIG. 2 is a sectional view of an optical pickup head of the optical recording/reproducing apparatus in accordance with the conventional art.

As illustrated, the conventional optical recording/reproducing apparatus includes: a swing arm 10 installed rotatable at a certain angle; an actuator 11 for rotatably driving the swing arm 10 and a head 20 installed at an edge portion of the swing arm 10 and scanning a track of a disk 12 by being floated on a disk 12 by virtue of pneumatics.

The head 20 includes a converging lens 21 mounted isolated as long as a focal distance from an objective lens 30 and a slider 22 for mounting the converging lens 21.

An air-bearing surface 22a is installed at a bottom surface of the slider 22 to levitate the slider 22 on the disk 12.

At an upper side of the head 20, there are installed a reflection mirror 41 and an optical transmitting and receiving unit 40 for transmitting and receiving optical beam in order to record/reproduce information to/from the disk 12, a recording medium.

An alignment tolerance between the position of the converging lens and the air-bearing surface is a crucial factor in determining a uniformity, a reliability and a resolution of an optical information signal recorded on and reproduced from the surface of the optical disk.

The alignment tolerance includes a evenness tolerance of the slider surface, a focal distance tolerance and a tilt tolerance in forward/backward and left/right directions of SIL (Solid Immersion Lens).

In the conventional optical recording/reproducing apparatus, because the converging lens, the slider including the air-bearing surface and the objective lens are separately manufactured and assembled. Thus, an alignment tolerance can not be avoided to degrade performance of the optical recording/reproducing apparatus.

Also, manufacturing of each component depends on grinding and cutting, so that mass-production can be hardly expected and uniformity between components is degraded, and the production efficiency is so low that a cost of production increases.

Moreover, difference of thickness of a protection layer formed on the record layer of the disk, a focal distortion due to an incomplete disk smoothness, and a change in a depth of focus cause a signal degradation.

SUMMARY OF THE INVENTION

Therefore, an object of the present invention is to provide a micro-actuator and its manufacturing method capable of considerably reducing a size and a weight of a system and improving a response speed by accomplishing a low voltage and low power bi-directional driving.

Another object of the present invention is to provide an optical pickup head of an optical recording/reproducing apparatus having a micro-actuator capable of heightening a uniformity and a production efficiency by reducing a alignment tolerance, and capable of optimally focusing a focal point of an objective lens on a record layer by correcting a tolerance caused due to an uneven thickness of a protection layer of the record layer on the disk and an uneven smoothness of the disk, and its manufacturing method.

To achieve these and other advantages and in accordance with the purpose of the present invention, as embodied and broadly described herein, there is provided a micro-actuator including: a lower substrate having a plurality of lower fixed electrodes formed at regular intervals at one side; an upper substrate installed at an upper side of the lower substrate and having a plurality of upper fixed electrodes formed at regular intervals at one side to correspond to the configuration of the lower substrate; an insulation layer interposed between the lower substrate and the upper substrate; a moving substrate having moving electrodes formed at an outer circumferential surface so as to be alternately arranged between the lower fixed electrodes and upper fixed electrodes, and being installed to be driven in a direction of an optical axis; an elastic member installed at the moving substrate to elastically return the moving substrate to an initial position; and a power supply unit for supplying power to the lower substrate, the upper substrate and the moving substrate to drive the moving substrate.

The elastic member is one or more spring elements arranged in a beam type or plate type to which a bi-metal is added and is a beam type or plate type to which a conductive thin film layer is added.

To achieve the above objects, there is also provided a method for manufacturing a micro-actuator including: a first step of preparing a basic material formed with a lower material, an upper material and an insulation layer interposed between the lower material and the upper material; a second step of patterning an etching mask at a surface of the lower material, removing portions of the lower material exposed through the etching mask in a vertical direction to expose the insulation layer to form lower fixed electrodes; a third step of removing the etching mask patterned at the lower material, patterning an etching mask at a surface of the upper material and removing portions of the upper material exposed between the etching mask of the upper material in a vertical direction to expose the insulation layer to form an upper fixed electrodes; a fourth step of etching a portion of the insulation layer to separate the moving electrodes from the upper fixed electrodes; a fifth step of etching a residual portion of the upper material and align the upper material and the lower material by using the etching mask patterned on the upper material; and a sixth step of disposing the moving electrode between the upper fixed electrodes and the lower fixed electrodes.

The upper material and the lower material are one of silicon, a conductor or a semiconductor.

In the fourth step, in order to align the shape of the upper material and the shape of the lower material, a double side alignment method is used.

In the sixth step, in order to dispose the moving electrode between the upper fixed electrodes and the lower fixed electrodes, a compressive residual stress can be applied to the moving electrodes or a self-weight of the moving electrodes can be used.

To achieve the above objects, there is also provided an optical pickup head of an optical recording/reproducing apparatus having a micro-actuator, including: a slider having a converging lens integrally formed at a central portion, a magnetic field-generating coil formed around the converging lens and an air-bearing surface formed at a lower surface; and an objective lens micro-actuator for micro-actuating an objective lens for transmitting optical beam of a transmitting/receiving unit to the converging lens in an optical axial direction.

The objective lens micro-actuator includes: a lower substrate positioned at an upper portion of the slide, having a mounting hole at a central portion and a plurality of lower fixed electrodes formed at regular intervals at an inner circumferential surface of the mounting hole; an upper substrate having a mounting hole at a central portion corresponding to a shape of the lower substrate, having a plurality of upper fixed electrodes formed at regular intervals at an inner circumferential surface of the mounting hole, and being installed at an upper side of the lower substrate; an insulation layer interposed between the lower substrate and the upper substrate; a moving substrate inserted in the mounting holes of the lower substrate and the upper substrate to be actuated in an optical axial direction, and having moving electrodes formed at an outer circumferential surface so as to be alternately arranged between the lower and upper fixed electrodes; a plurality of electrode pads for supplying power to the lower substrate, the upper substrate and the moving substrate in order to drive the moving substrate.

In order to elastically return ore the moving substrate to its initial position, an elastic member is installed at the moving substrate.

An anti-refraction coating film is formed on the converging lens, and a protection layer or a lubrication layer as like DLC (Diamond-Like Carbon) is formed at the surface of the air-bearing surface.

To achieve the above objects, there is also provided a method for manufacturing an optical pickup head of an optical recording/reproducing apparatus having a micro-actuator, including: a first step of manufacturing a slider having a converging lens integrally formed at a central portion, a magnetic field-generating coil formed around the converging lens and an air-bearing surface formed at a lower surface, and an objective lens actuator for micro-actuating an objective lens for transmitting optical beam of a transmitting/receiving unit to the converging lens in an optical axial direction as components by using a micro-machining and a semiconductor device manufacturing process; a second step of aligning and bonding the slider and the objective lens actuator by using an alignment mark; and a third step of aligning the objective lens in the same optical axial direction as the converging lens.

To achieve the above objects, there is also provided a method for manufacturing an optical pickup head of an optical recording/reproducing apparatus having a micro-actuator, including: a first step of manufacturing a slider having a converging lens integrally formed at a central portion, a magnetic field-generating coil formed around the converging lens and an air-bearing surface formed at a lower surface, and an objective lens actuator for micro-actuating an objective lens for transmitting optical beam of a transmitting/receiving unit to the converging lens in an optical axial direction in a wafer form by using a micro-machining and a semiconductor device manufacturing process; a second step of aligning and bonding the slider and the objective lens actuator by using an alignment mark; a third step of cutting the bonded wafer to individual optical pickup head chips; and a fourth step of installing the objective lens and the converging lens to be aligned in an optical axial direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3 to 8 show a micro-actuator in accordance with the present invention, of which FIG. 3 is a perspective view of a portion of the micro-actuator;

FIG. 4 is a plan view of FIG. 3

FIG. 5 is a sectional view taken along line A-A of FIG. 4;

FIG. 6 is a sectional view taken along line B-B of FIG. 4;

FIG. 7 is a view for explaining a principle of the micro-actuator; and

FIG. 8 is an enlarged view of a major part of FIG. 7;

FIGS. 10 to 15 show an optical pickup head of an optical recording/reproducing apparatus in accordance with the present invention, of which FIG. 10 is a separated perspective view showing the optical pickup head;

FIG. 11 is a plan view of FIG. 10;

FIG. 12 is a sectional view taken along line C-C of FIG. 11;

FIG. 13 is a perspective view of the micro-actuator of FIG. 10;

FIG. 14 is a plan view of FIG. 13;

FIG. 15 is a sectional view taken along line D-D of FIG. 14; and

FIGS. 16 to 18 are vertical sectional views for explaining a correction principle of a depth of focus, of which FIG. 16 shows a depth of focus when a protection layer of a disk has a suitable thickness;

FIG. 17 shows a depth of focus when the protection layer of the disk is thin; and FIG. 18 shows a depth of focus when the protection layer of the disk is thick.

DETAILED DESCRIPTION OF THE PREFERRED EMBODIMENTS

Reference will now be made in detail to the preferred embodiments of the present invention, examples of which are illustrated in the accompanying drawings.

A micro-actuator in accordance with the present invention will now be described with reference to the accompanying drawings.

Figure 3:
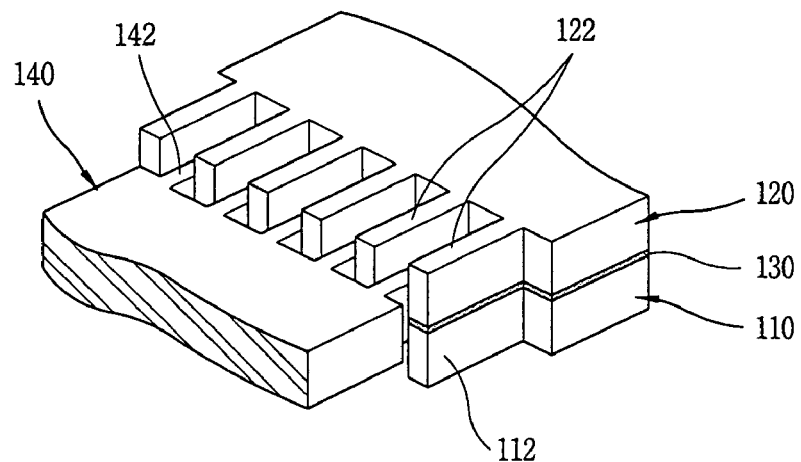
Figure 4:
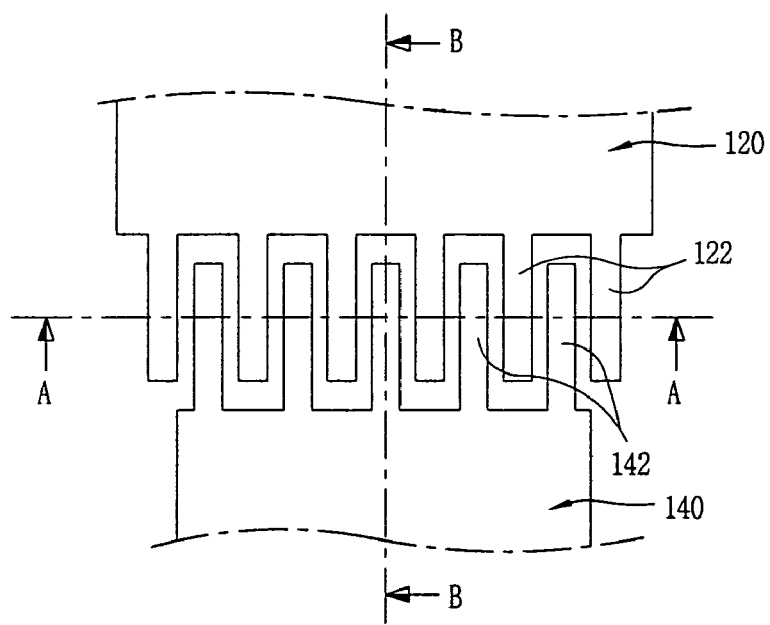
Figure 5:
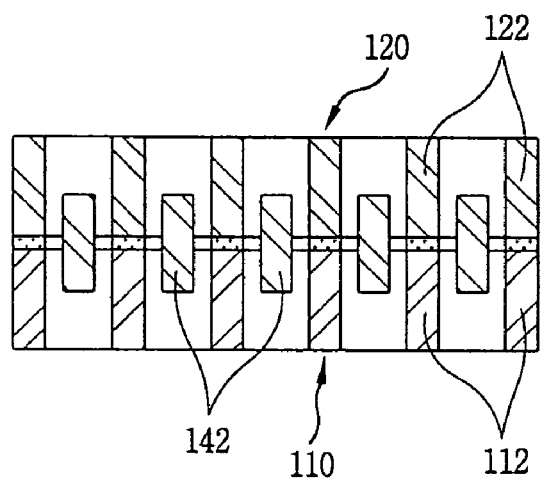
Figure 6:
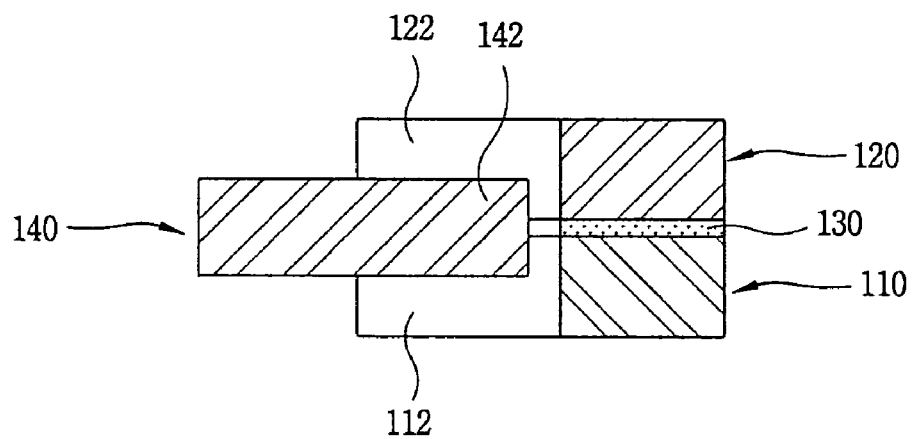
Figure 7:
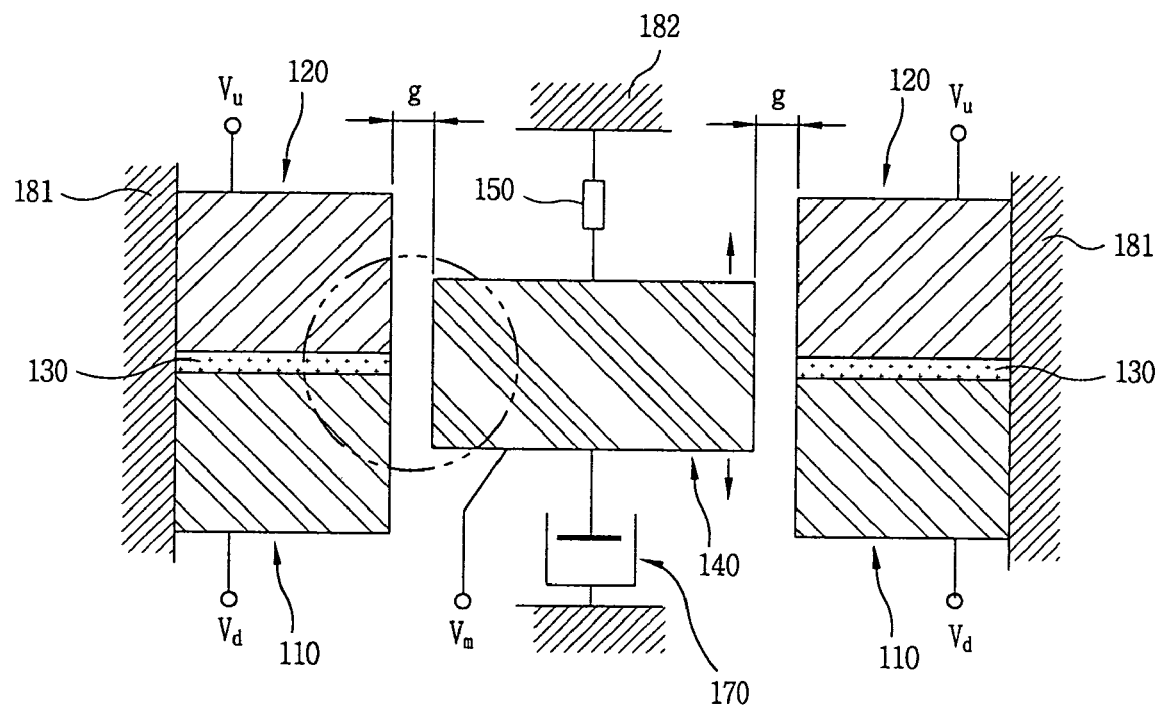
Figure 8:
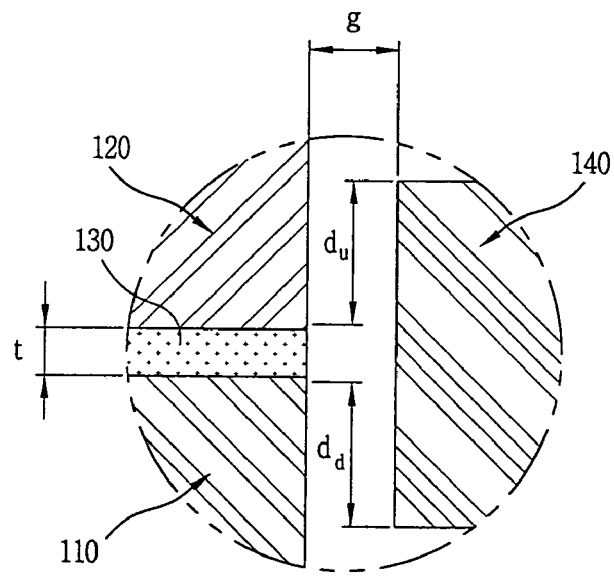

FIGS. 3 to 8 show a micro-actuator in accordance with the present invention, of which FIG. 3 is a perspective view of a portion of the micro-actuator, FIG. 4 is a plan view of FIG. 3, FIG. 5 is a sectional view taken along line A-A of FIG. 4, FIG. 6 is a sectional view taken along line B-B of FIG. 4, FIG. 7 is a view for explaining a principle of the micro-actuator, and FIG. 8 is an enlarged view of a major part of FIG. 7.

As shown in the drawings, a micro-actuator of the present invention includes a lower substrate 110 having a plurality of lower fixed electrodes 112 formed at regular intervals at one side; an upper substrate 120 installed at an upper side of the lower substrate 110 and having a plurality of upper fixed electrodes 122 formed at regular intervals at one side to correspond to the configuration of the lower substrate 110; an insulation layer 130 interposed between the lower substrate 110 and the upper substrate 120; a moving substrate 140 having moving electrodes 142 formed at an outer circumferential surface so as to be alternately arranged between the lower fixed electrodes 112 and upper fixed electrodes 122, and being installed to be driven in a direction of an optical axis; an elastic member 150 installed at the moving substrate 140 to elastically return the moving substrate 140 to an initial position; and a power supply unit Vd, Vu and Vm for supplying power to the lower substrate 110, the upper substrate 120 and the moving substrate 140 to drive the moving substrate 140.

That is, a plurality of lower fixed electrodes 112 are formed at regular intervals at one side of a lower substrate 110. An upper substrate 120 is installed at an upper surface of the lower substrate 110 corresponding to the shape of the lower substrate 110 includes a plurality of upper fixed electrodes 122 formed at regular intervals at one side.

An insulation layer 130 is interposed between the lower substrate 110 and the upper substrate 120. The insulation layer 130 can be a thermal oxide film, a low temperature oxide (LTO) film, a low temperature nitride film or a polyimide, or any other material can be adopted as the insulation layer so long as it has excellent electric insulation characteristics and can be easily deposited, bonded or coated at a surface of the upper and lower substrates.

A moving substrate 140 includes a moving electrodes 142 formed at an outer circumferential surface so as to be alternately arranged between the lower fixed electrodes 112 and upper fixed electrodes 122, and is installed to be driven in a direction of an optical axis (in the focal direction).

The lower fixed electrodes 112, the upper fixed electrodes 122 and the moving electrodes 142 are made of an electrolytic-plated metal.

In order to elastically restore the moving substrate 140 to an initial position and drive it in an optical axial direction, a beam type or a plate type spring 150 as an elastic member is suspended at one side of the moving substrate 140. As the elastic member, besides the spring, a bi-metal or a conductive thin film layer can be also used.

The lower substrate 110 and the upper substrate 120 are fixed at a first fixing unit 181, and a beam type or plate type spring 150 is fixed at a second fixing unit structure 182. The moving electrodes 142 are isolated as much as a certain gap $g_1$ by a free space.

The free space of the edge can be vacuum, air or an insulation fluid.

The thickness "t" of the insulation layer 130 should be set suitable so that a breakdown may not occur even if a difference of voltage between the upper fixed electrodes 122 and the lower fixed electrodes 112 are maximized. A damper 170 may be installed at the other side of the moving substrate 140.

In order to driving the moving substrate 140, Vd, Vu and Vm are prepared as power supply units for supplying power to the lower substrate 110, the upper substrate 120 and the moving substrate 140.

A driving force working between the moving electrodes and the upper fixed electrodes, lower fixed electrodes in the micro-actuator is expressed by below equation (1):

$$F = \frac{\varepsilon \cdot l}{2g} \cdot (V_u - V_d) \cdot (V_u + V_d - 2V_m) \quad (1)$$

wherein "F" is a force working for the moving electrodes, "G" is a gap between the moving electrodes and the upper fixed electrodes, and a gap between the moving electrodes and the lower fixed electrode, 'l' is an overlap length of sections of the moving electrodes and the upper fixed electrodes, and an overlap length of the moving electrodes and the lower fixed electrodes in a vertical direction, Vd, Vu and Vm are voltages of the lower fixed electrodes, the upper fixed electrodes and the moving electrodes, and $\epsilon$ is a permittivity constant.

As noted in equation (1), if a difference between the voltages applied to the moving electrodes and the upper fixed electrodes are greater than a difference between voltages applied to the moving electrodes and the lower fixed electrodes, the moving electrodes are moved upwardly. If, however, the difference between the voltages applied to the moving electrodes and the upper fixed electrodes are greater than the difference between voltages applied to the moving electrodes and the lower fixed electrodes, the moving electrodes are moved downwardly.

In other words, at a point where a driving force of the moving electrodes and elastic force by an elastic coefficient "k" of the spring supporting the moving substrate are balanced, a displacement of the moving electrodes are determined.

When the voltages applied to the moving electrodes, the upper fixed electrodes and the lower fixed electrodes are removed, the moving electrodes are returned to its initial position by virtue of the restoration force of the spring.

A capacitance when the micro-actuator is applied to an electrode of a capacitance type sensor can be expressed by below equation (2):

$$C_{12} = \frac{\varepsilon \cdot l \cdot d_u}{g} \cdot C_{13} = \frac{\varepsilon \cdot l \cdot d_d}{g} \qquad (2)$$

wherein $C_{12}$ is a capacitance by the moving electrodes and the lower fixed electrodes, $C_{13}$ is a capacitance by the moving electrodes and the upper fixed electrodes, $d_u$ and $d_d$ are respectively a distance in an optical axial direction from an upper edge of the moving substrate to a lower edge of the upper fixed substrate, and a distance in an optical axial direction from the lower edge of the moving substrate to an upper edge of the lower fixed substrate.

The differential component capacitance C of the two capacitors is expressed by below equation (3):

$$C = \frac{\varepsilon \cdot l}{g} \cdot (d_u - d_d) \qquad (3)$$

When the moving electrodes is moved along a driving direction as much as a displacement $\Delta d$ by a physical amount or a chemical amount to be detected, an amount of change in the differential component capacitance $\Delta C$ is expressed by below equation (4):

$$\Delta C = 2 \cdot \frac{\varepsilon \cdot l}{g} \cdot \Delta d \qquad (4)$$

That is, the differential component capacitance corresponds to double the amount of change in the capacitance of the conventional uni-directional capacity type sensor, and the increase in the amount of change in the capacitance means enhancement of a sensitivity and resolution of the capacitance type sensor.

A method for manufacturing the micro-actuator in accordance with the present invention will now be described.

FIGS. 9A to 9G are a sequential process of manufacturing the micro-actuator.

Left sides (a) of FIGS. 9A through 9G correspond to FIG. 5, while the right sides (b) correspond to FIG. 6.

As illustrated, a method for manufacturing the micro-actuator including: a first step of preparing a basic material formed with a lower silicon (LS), a lower material, an upper silicon (US), an upper material, and an insulation layer 130 interposed between the lower silicon (LS) and the upper silicon (US); a second step patterning an etching mask (LM) at a surface of the lower silicon (LS), removing portions of the lower silicon (LS) exposed through the etching mask (LM) in a vertical direction to expose the insulation layer 130 to form lower fixed electrodes 112, a third step of removing the etching mask patterned at the lower material, patterning an etching mask (UM) at a surface of the upper silicon (US) and removing portions of the upper silicon (US) exposed between the etching masks (UM) of the upper silicon (US) in a vertical direction to expose the insulation layer 130 to form a plurality of upper fixed electrode 122; a fourth step of etching a portion of the insulation layer 130 to separate the each moving electrode 142 from the each upper fixed electrode 122; a fifth step of etching a residual portion of the upper silicon (LS) and align the upper silicon (US) and the lower silicon (LS) by using the etching mask (UM) patterned on the upper silicon; and a sixth step of disposing the each moving electrode 142 between the each upper fixed electrode 122 and the each lower fixed electrode.

The method for manufacturing the micro-actuator will now be described in detail.

To begin with, the basic material is formed as a so-called wafer type SOI (Silicon on Insulator) substrate consisting of the upper silicon (US), the insulation layer 130 and the lower silicon(LS).

Through a follow-up process, the upper silicon (US) is formed as the fixed electrode 122 and the moving electrode 142, while the lower silicon (LS) is formed as the fixed electrode 112.

The lower material and the upper material of the basic material can be a semiconductor material or a conductor material as well as the silicon material.

The insulation layer 130 can be made of various materials such as a silicon oxide film, a silicon nitride film and a polymer thin film, and a suitable material is preferably selected according to a manufacturing method of the micro-actuator.

Figure 9A:
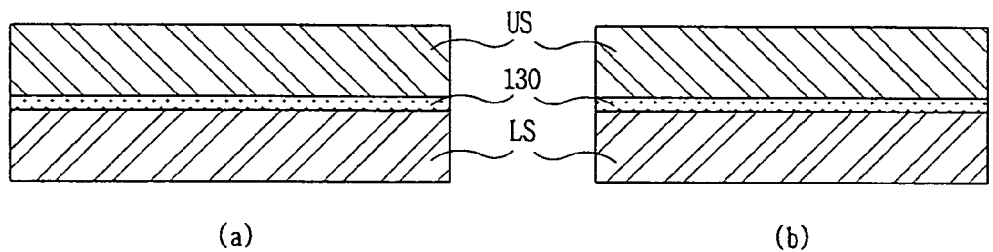
FIGS. 9A to 9G are a sequential process of manufacturing the micro-actuator.

When the basic material of the wafer type is prepared, as shown in FIG. 9A, a washing process is performed to remove a contaminant of the surface, and then a etching mask is patterned on the surface of the lower silicon (LS) by using a series of semiconductor manufacturing process such as a photolithography, a thin film deposition process and an etching process.

Figure 9B:
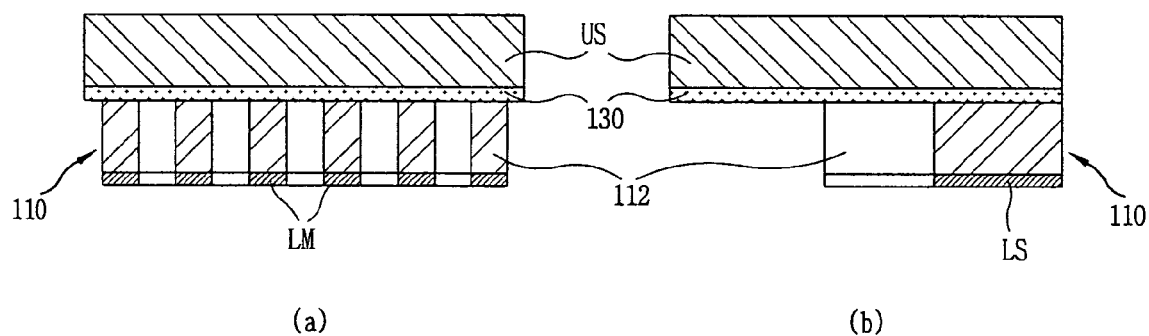

Next, as shown in FIG. 9B, a portion of the lower silicon (LS) exposed through the etching mask is selectively removed in a vertical direction to expose the insulation layer 130 by using a silicon deep reactive ion etching technique, a sort of an anisotropic etching technique, to form the lower fixed electrode 112 of the lower substrate 110.

After the lower fixed electrode 112 is completed by etching the lower silicon (LS), the etching mask (LM) is selectively removed.

Figure 9C:
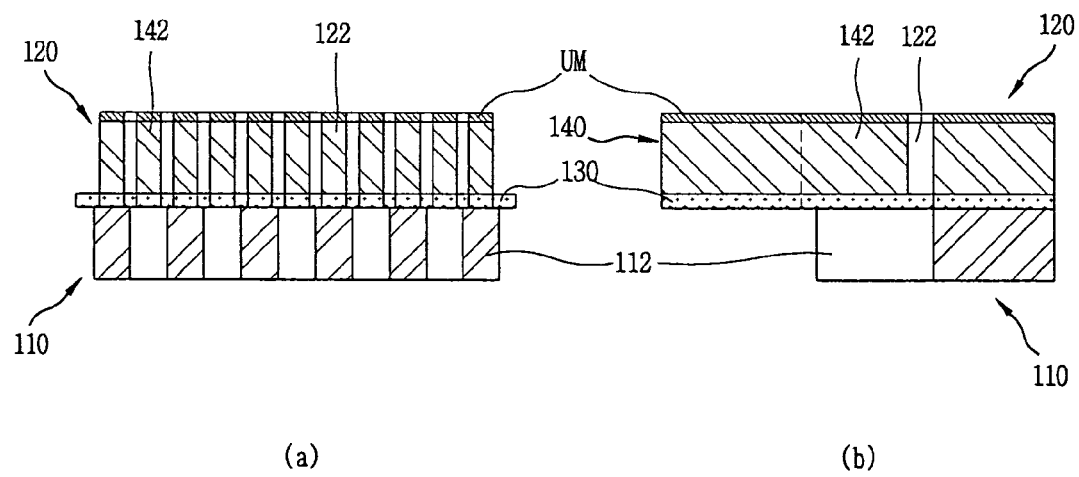

And then, as shown in FIG. 9C, an etching mask (UM) is patterned on the upper surface of the upper silicon (US) by using the above-mentioned semiconductor manufacturing process. And, a portion of the upper silicon (US) exposed through the etching mask (UM) is selectively removed in a vertical direction by using the silicon deep reactive ion etching technique until the insulation layer 130 is exposed.

Figure 9D:
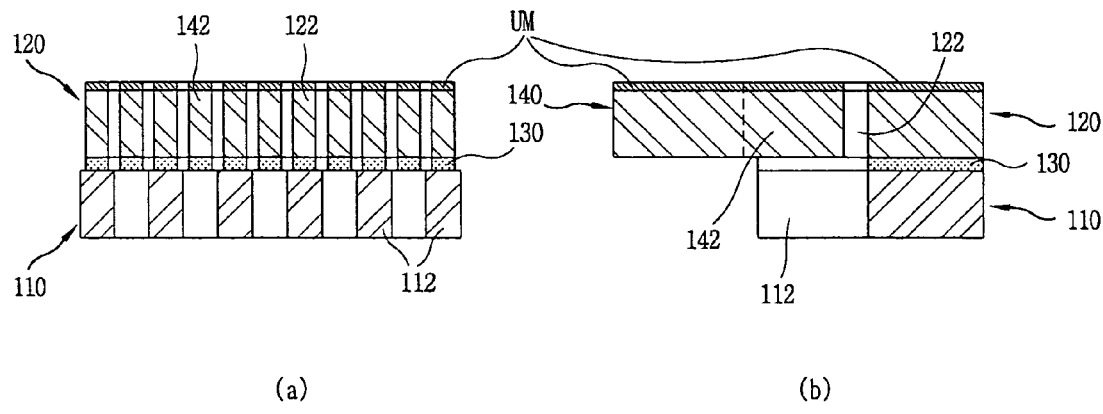

As shown in FIG. 9D the insulation layer 130 of the silicon oxide film exposed by selectively removing the upper silicon is selectively removed by using a wet chemical etching or a dry etching to separate the moving electrode 142 of the moving substrate 140 and the upper fixed electrode 122 of the upper substrate 120.

Figure 9E:
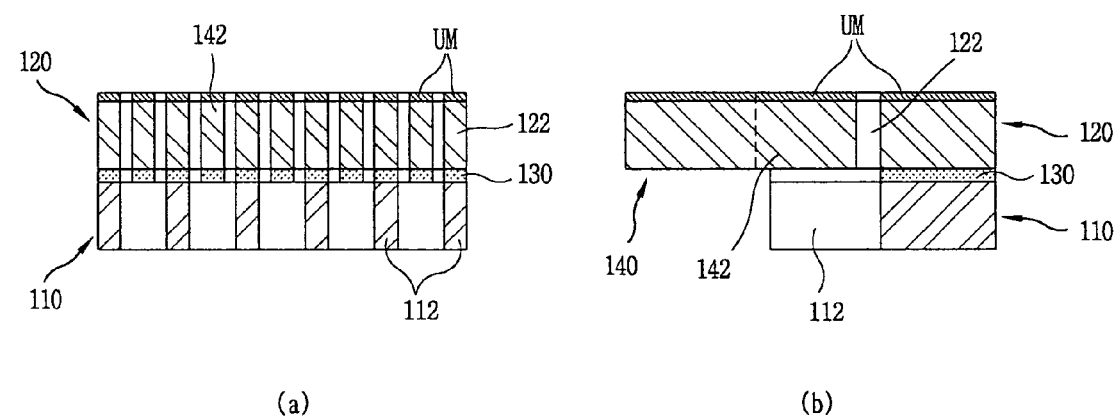

Thereafter, a residual silicon from the upper silicon to the lower silicon is removed downwardly by using the silicon deep reactive ion etching technique by using the etching mask (UM). Then, as shown in FIG. 9E, the upper fixed electrode 122 of the upper substrate 120 and the lower fixed electrode 122 of the lower substrate 110 are self-aligned.

Figure 9F:
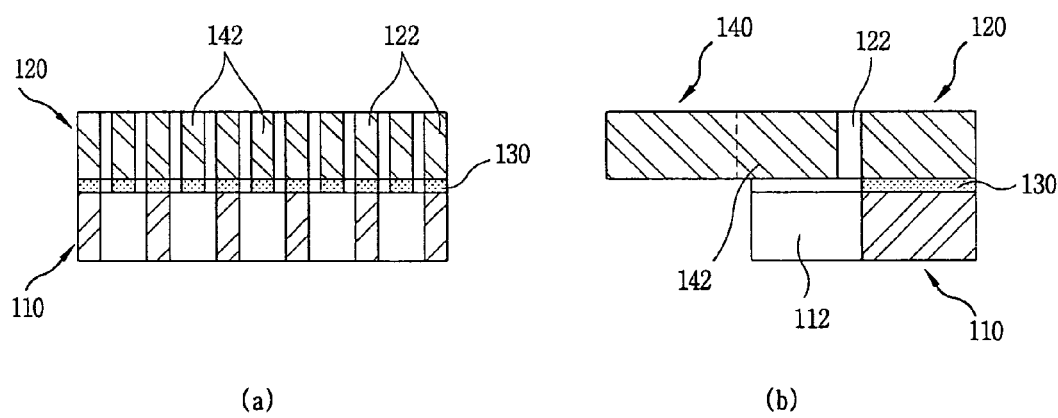

Subsequently, as shown in FIG. 9F, the insulation layer 130 remaining at the lower side of the moving electrode 142 of the moving substrate 140 and the etching mask (UM) formed at the upper side of the upper fixed electrode 122 are removed.

In this respect, the insulation layer 130 remaining at the lower side of the moving electrode 142 may not be removed to be used as a micro-electrode structure.

Referring to FIG. 9C, in order to align the upper silicon etching mask pattern to the shape of the lower silicon (LM), a double side alignment technique among micro-machining techniques is used.

Figure 9G:
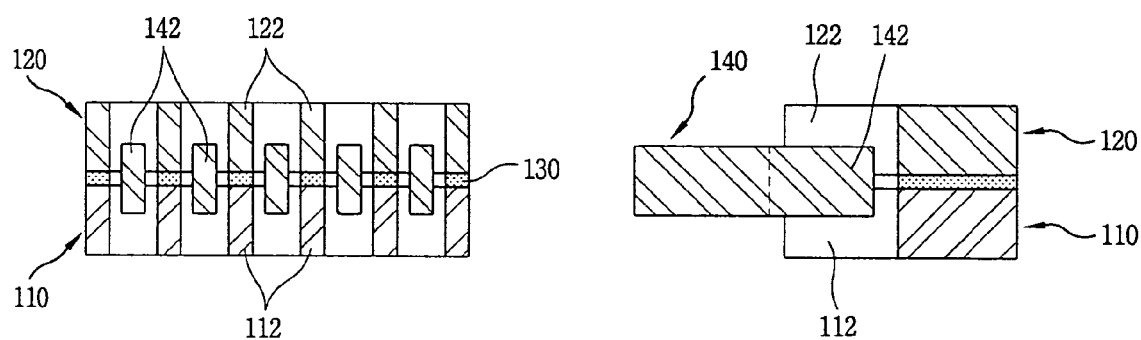

Thereafter, as shown in FIG. 9G, the moving electrode 142 of the moving substrate 140 is disposed or overlaps to be positioned at the center between the fixed electrode 122 of the upper substrate 120 and the lower fixed electrode 112 of the lower substrate 110, thereby completing manufacturing of the micro-actuator.

Positioning or overlapping the moving electrodes at the center of the fixed electrode and the lower fixed electrode can be made by various ways: One example can be transforming of the elastic member. That is, the elastic member is connected to the moving electrode and transformed to dispose or overlap the moving electrode in the optical axial direction.

Another example can be using a bi-metal. That is, bi-metals having different thermal expansion rates are stacked, to which power is applied for a heat distortion of the bi-metals, and then the moving electrode is disposed.

Still another example is disposing the moving electrode by using a dead load of the moving electrode.

Yet another example is to use an electrostriction effect. In this method, a capacitor of piezoelectric material such as PZT or ZnO inserted between the conductive thin film layers of metal is stacked, and a certain voltage is applied between the two conductive thin film layers for their transformation, and then, the moving electrode is disposed.

In this manner the micro-actuator and its manufacturing method accomplishes a low voltage and low power bi-directional driving. By adopting this technique, a capacitance sensor can make a differential detection and thus heighten a sensitivity and resolution. And in case of a system adopting this technique, its size and weight can be considerably reduced and a response speed can be enhanced.

The optical pickup head of the optical recording/reproducing apparatus of the present invention will now be described.

Figure 10:
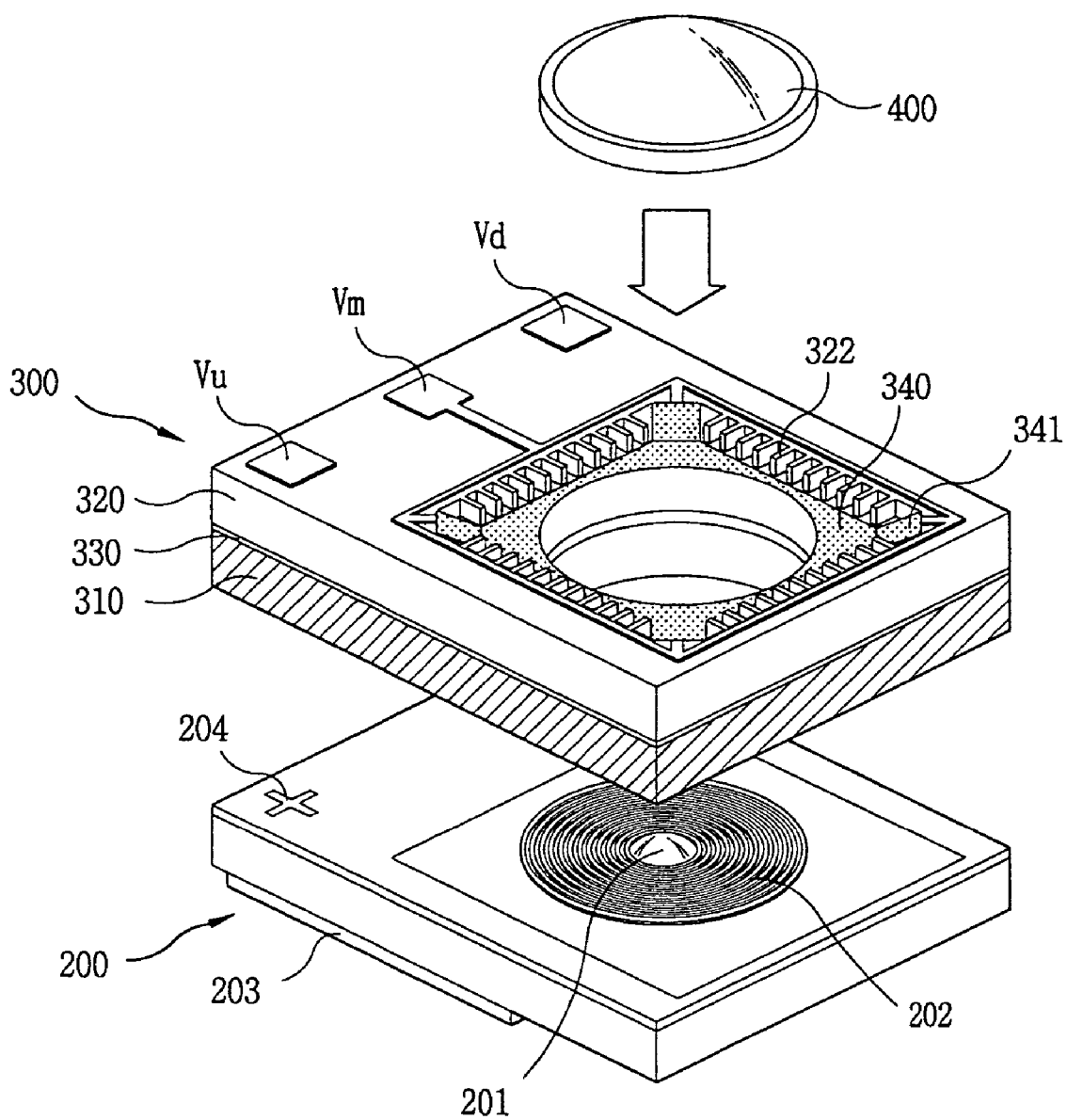
Figure 11:
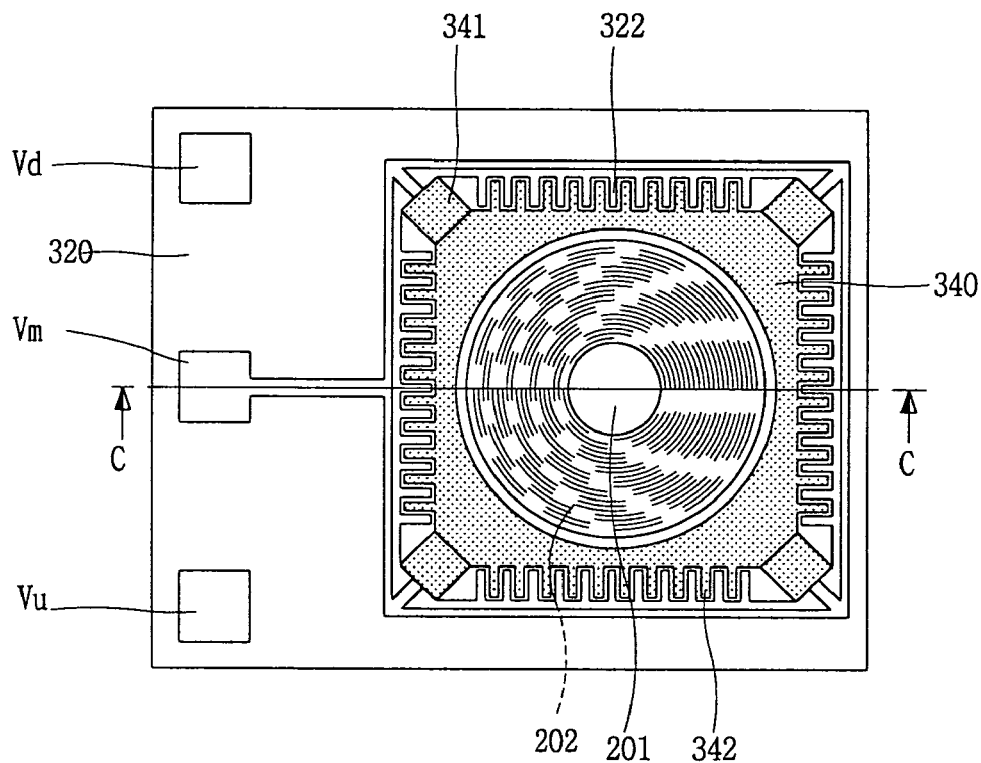
Figure 12:
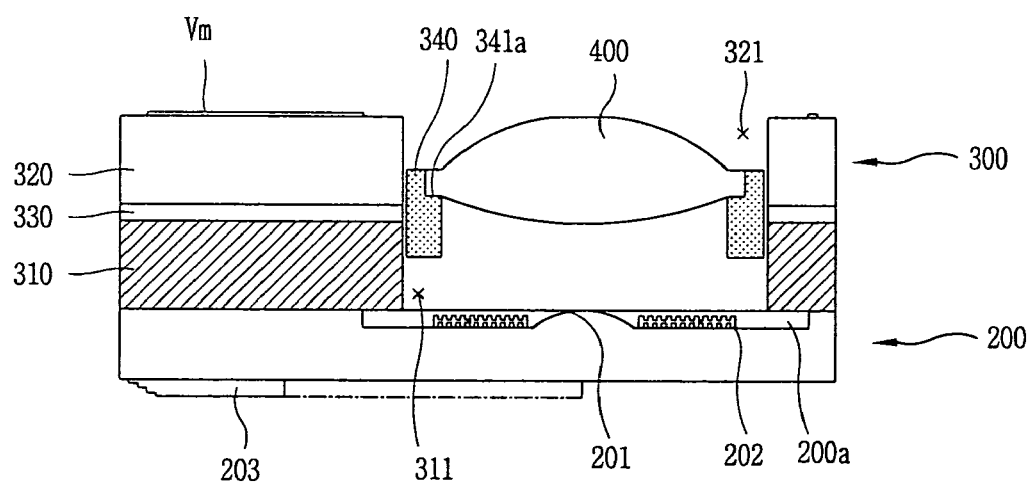
Figure 13:
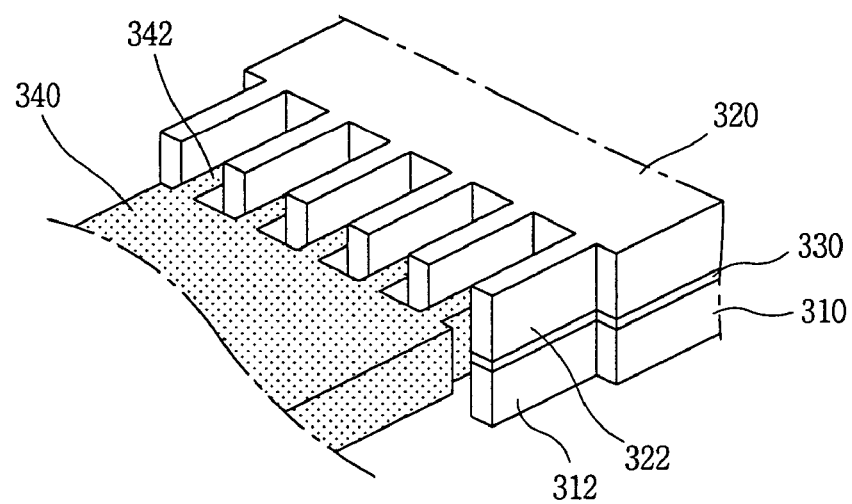
Figure 14:
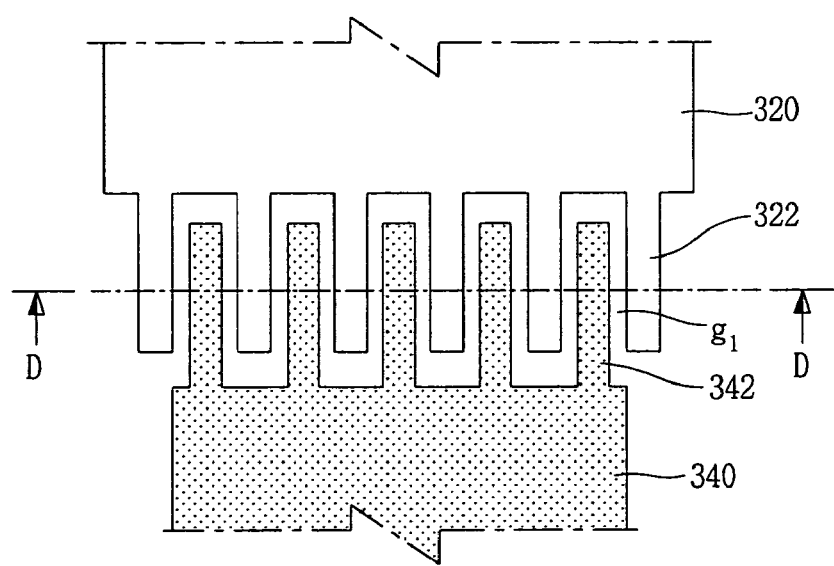
Figure 15:
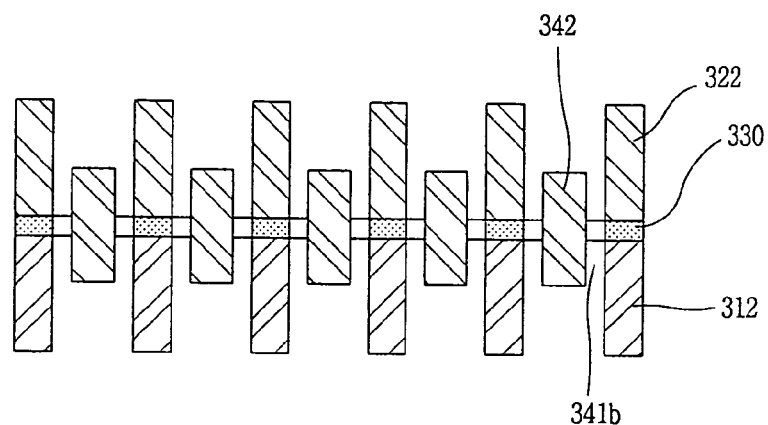

FIG. 10 is a separated perspective view showing the optical pickup head, FIG. 11 is a plan view of FIG. 10, FIG. 12 is a sectional view taken along line C-C of FIG. 11, FIG. 13 is a perspective view of the micro-actuator of FIG. 10,
FIG. 14 is a plan view of FIG. 13, and FIG. 15 is a sectional view taken along line D-D of FIG. 14.

Figure 1:
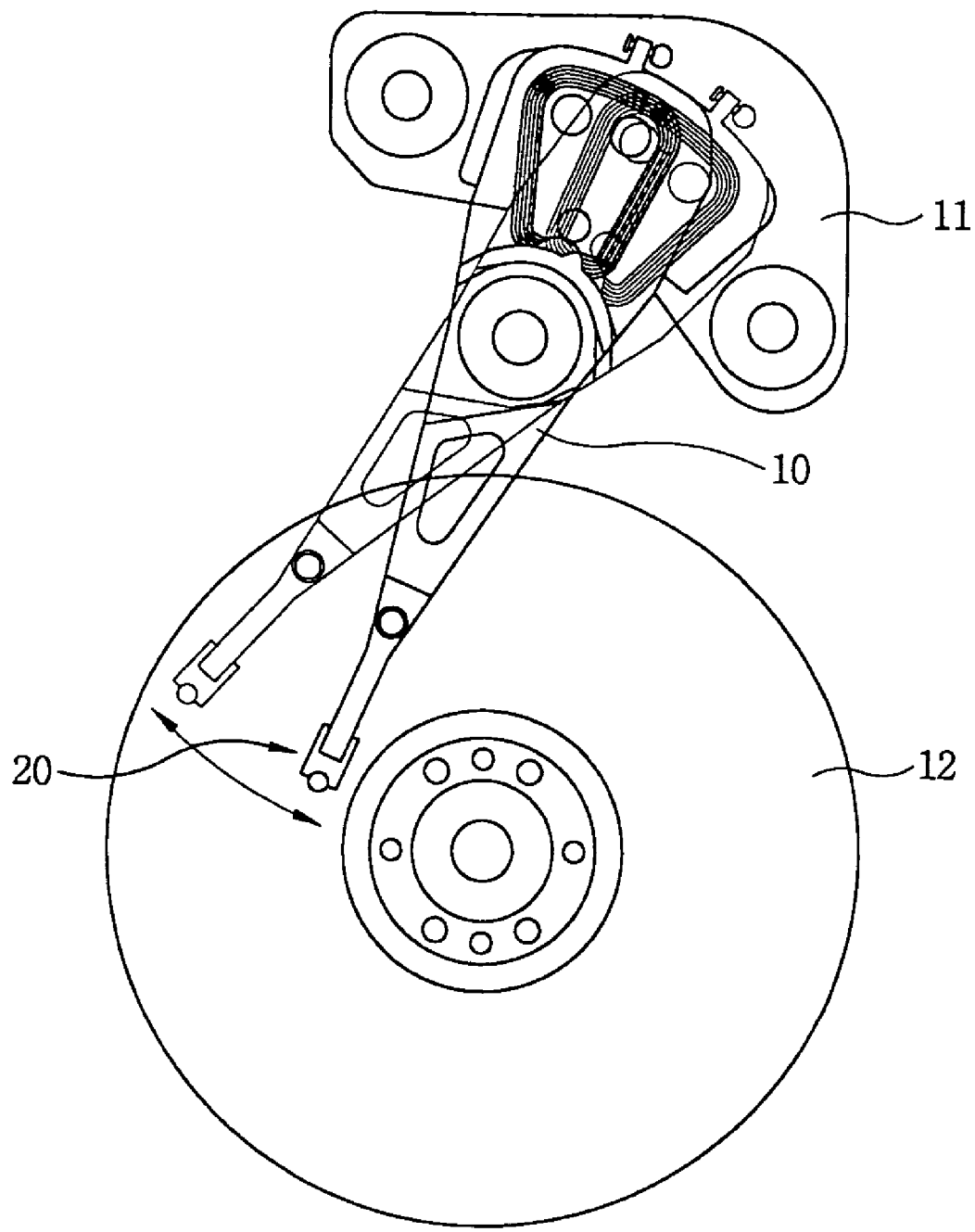
FIG. 1 is a plan view of an optical recording/reproducing apparatus in accordance with a conventional art.
Figure 2:
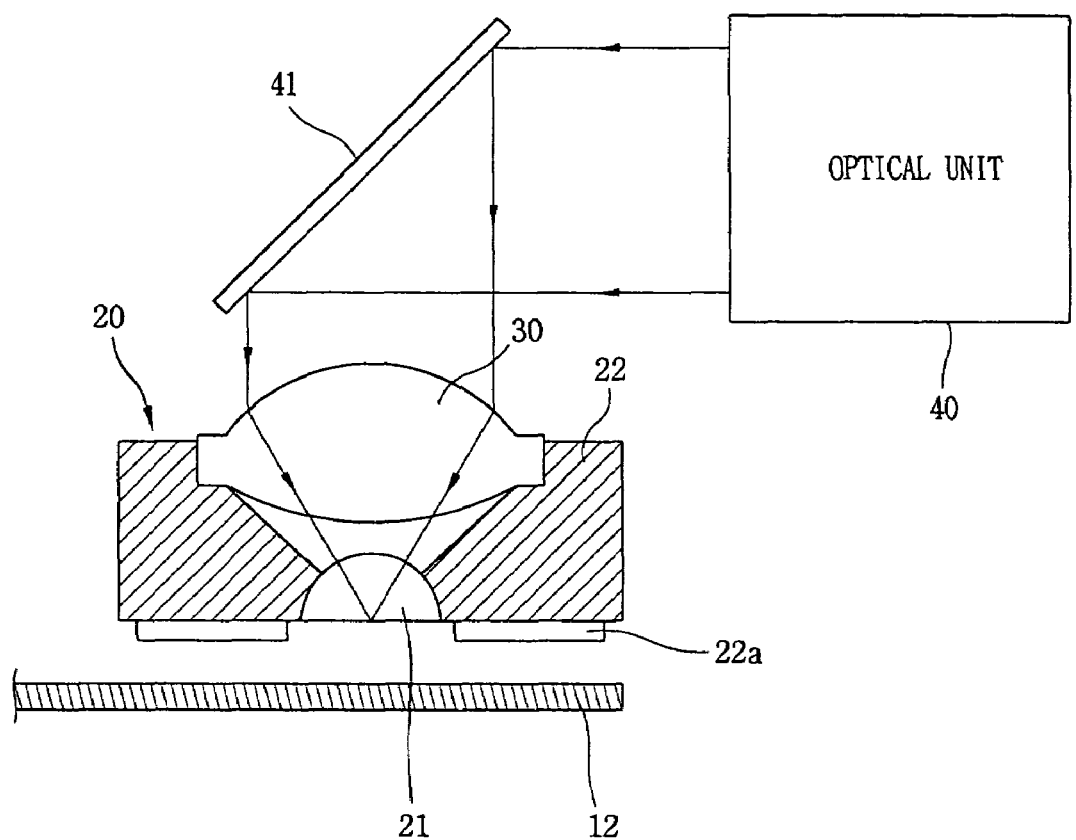
FIG. 2 is a sectional view showing an optical pickup head of the optical recording/reproducing apparatus in accordance with the conventional art.

As illustrated in the drawings, the optical pickup head of the optical recording/reproducing apparatus of the present invention includes: a slider 200 made having a substrate structure made of a transparent material with a converging lens 201 integrally formed at the central portion thereof; and a micro-actuator 300 for micro-actuating an objective lens 400 for transmitting optical beam of a optical beam transmitting and receiving unit 40 (refer to FIG. 2) to the converging lens 201 in an optical axial direction.

An air-bearing surface 203 is formed at a lower surface of the slider 200, on which a protection layer or a lubrication layer is formed. At both surface of the slider 200, an alignment mark 204 is formed to align the micro-actuator 300 and the slider 200 in the optical axial direction.

The converging lens 201, focusing optical beam on the record layer of the disk, is integrally formed at an upper surface of the slider 200. Preferably, a non-reflection coating film is formed on the converging lens 201.

A magnetic field generation coil 202 is formed around the converging lens 201, for performing a direct-rewritable function of an optical magnetic recording. If the optical pickup head is applied to an optical storing unit which uses a phase change, not the optical magnetic recording mode, the magnetic field generation coil can be omitted.

The magnetic field generation coil 202 is formed as a spiral planar coil type to be concentric with an optical axis at a bottom surface of an etched recess 200a formed at the upper surface of the slider 200.

The magnetic field generation coil 202 can be formed at the surface where the converging lens 201 is formed, and preferably, it is formed at a rear surface of the surface where the converging lens 201 is formed.

When a current is applied from an external power source to the magnetic field generation coil 202, a magnetic field proportional to the value of the current is generated in the optical axial direction, changing a magnetic polarization of the optical magnetic material, the record layer of the disk. Accordingly, information can be recorded or rewritten.

The objective lens micro-actuator 300 includes: a lower substrate 310 positioned at an upper side of the slide 200 and having a mounting hole 311 at its central portion and a plurality of lower fixed electrode 312 formed at regular is intervals at an inner circumferential surface of the mounting hole 311; an upper substrate 320 having a mounting hole 321 at the central portion and a plurality of fixed electrodes 322 formed at regular intervals at an inner circumferential surface of the mounting hole 321 corresponding to the shape of the lower substrate 310, and installed at an upper side of the lower substrate 110; an insulation layer 330 interposed between the lower substrate 110 and the upper substrate 120; a moving substrate 340 inserted between the mounting hole 311 of the lower substrate 310 and the mounting hole 321 of the upper substrate 320 so as to be installed to be driven in the optical axial direction, and having a moving electrode 342 formed at an outer circumferential surface and alternately arranged between the lower fixed electrode 312 and the upper fixed electrode 322; and a plurality of electrode pads Vd, Vu and Vm for supplying power to the lower substrate 310, the upper substrate 320 and the moving substrate 340 in order to drive the moving substrate 340.

An elastic member 341 is installed at an edge of the moving substrate 340 to elastically support the moving substrate 340. An engaging jaw 341a is formed at an upper surface of the moving substrate 340 in order to mounted an objective lens 400 thereon. A void $g_2$ is formed between the moving electrode 342 and the upper fixed electrodes 312 and lower fixed electrodes 322.

An operation for controlling a depth of focus of the optical pickup head in accordance with the present invention will now be described with reference to FIGS. 16 to 18.

Figure 16:
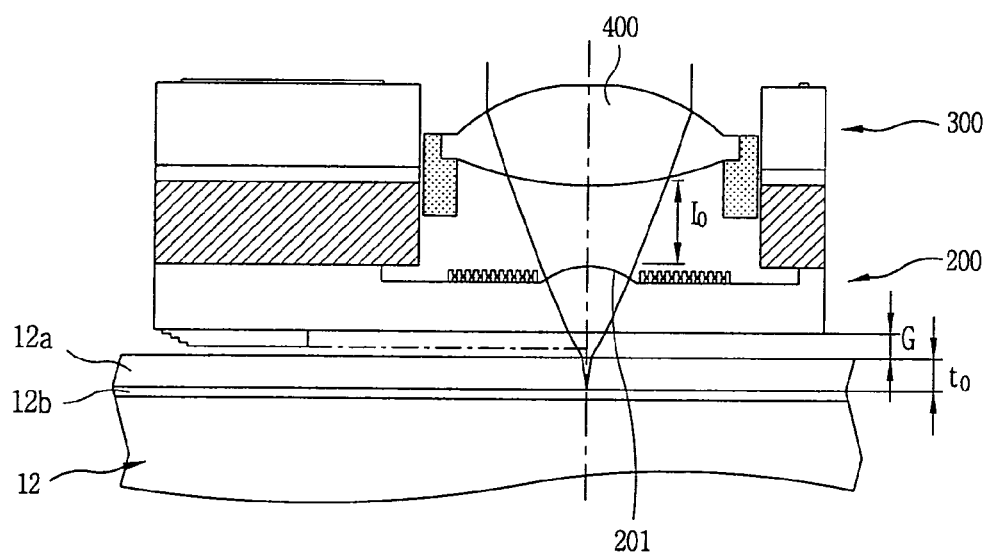
Figure 17:
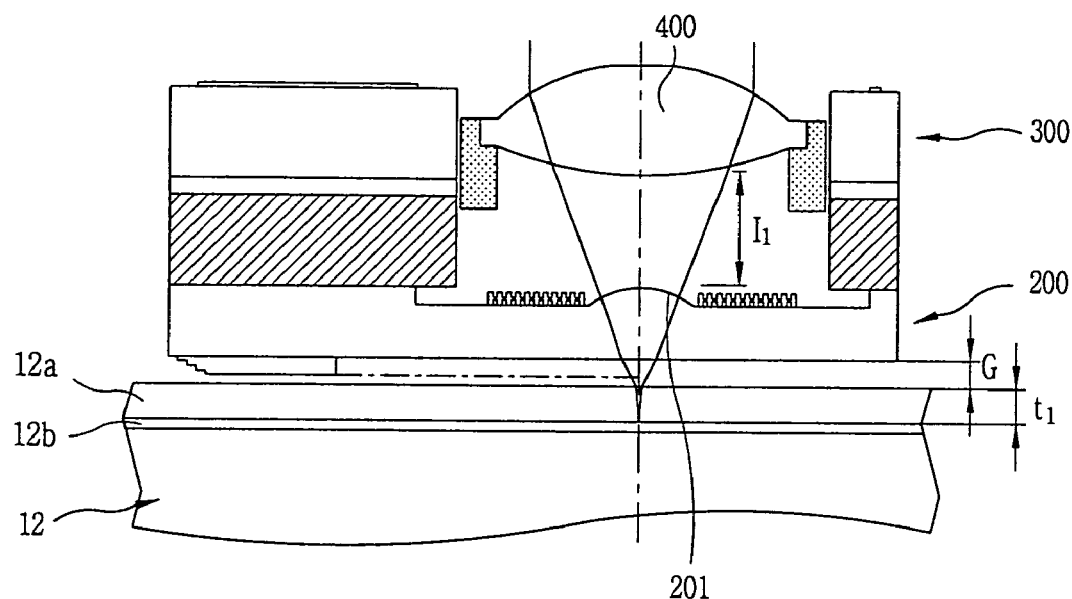
Figure 18:
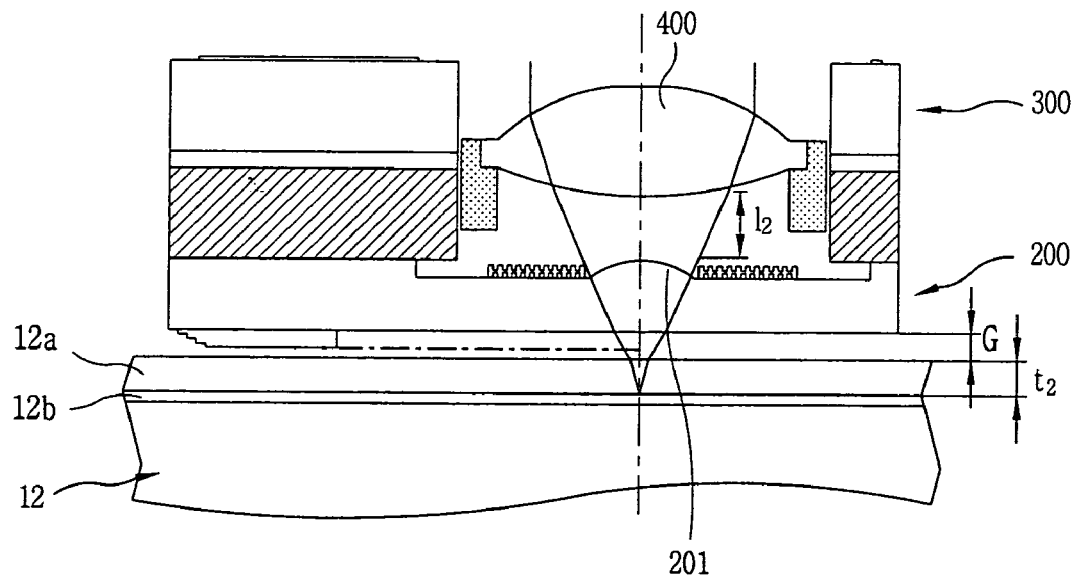

FIGS. 16 to 18 are vertical sectional views for explaining a correction principle of a depth of focus, of which FIG. 16 shows a depth of focus when a protection layer of a disk has a suitable thickness, FIG. 17 shows a depth of focus when the protection layer of the disk is thin, and FIG. 18 shows a depth of focus when the protection layer of the disk is thick.

FIG. 16 shows a case that the thickness of the protection layer 12*a* on the record layer 12*b* of the disk 12 is identical to an ideal value in an optical design without a thickness tolerance and a optical beam made incident from outside is an ideal parallel optical beam.

With reference to FIG. 16, "G" is a distance between an upper surface of the protection layer 12*a* of the disk 12 and the bottom of the slider 200, $t_0$ is an ideal thickness of the protection layer 12*a* within a tolerance range in optical design, and $l_0$ is a distance between the objective lens 400 and the converging lens 201.

In this state, even if an optical signal is recorded or reproduced at a null position without driving the object lens 400, the optical beam is accurately focused on the record layer 12*b* of the disk 12 being rotated, so that the optical signal is not degraded and a stable operation is performed.

FIG. 17 shows a case that the thickness $t_1$ of the protection layer 12*a* of the disk 12 is thinner than the ideal value in design an optical system.

In FIG. 17, "G" is a distance between the upper surface of the protection layer 12*a* of the disk 12 and the bottom of the slider 200, $t_1$ is the thickness of the protection layer formed thin beyond the ideal value in the optical design, and $l_1$ is a distance between the objective lens 400 and the converging lens 201.

In this abnormal state, the objective lens 400 is moved upwardly by the micro-actuator 300 to increase the gap $l_1$, thereby correcting the thickness of the protection layer 12*a* of the disk 12 which is thin as the depth of focus be far from the bottom surface of the slider 200.

In this respect, if the protection layer 12*a* of the disk 12 is thin, the objective lens micro-actuator 300 corrects the focal distance displacement as much as the reduced thickness of the protection layer, provided that the rotation number per hour or rotation angular velocity of the disk per hour is constant.

Finally, FIG. 18 shows a case that the thickness $t_2$ of the protection layer 12*a* on the record layer 12*b* of the disk 12 is greater than the ideal design value.

In FIG. 18, "G" is a distance between the upper surface of the protection layer 12*a* of the disk 12 and the bottom of the slider 200, $t_2$ is the thickness of the protection layer formed greater than the ideal value in the optical design, and $l_2$ is a distance between the objective lens 400 and the converging lens 201

In this abnormal state, the objective lens 400 is moved downwardly by the micro-actuator 300 to reduce the gap $l_2$, thereby correcting the thickness of the protection layer 12*a* of the disk which is thin as the depth of focus be near to the bottom of the slider 200 is distanced.

In order to determine an optimum position of the objective lens 400 driven by the micro-actuator, to detect an optical signal of a level determined by a detector for an optical focusing servo of the optical beam transmitting and receiving unit 40 (refer to FIG. 2) after optical beam is reflected form the record layer of the disk, an optical signal detector and an input terminal of an actuator are controlled by a sub-feedback circuit.

Likewise, for an assembly error of an independent optical system and an tolerance of an incident culmination parallel optical beam resulted from a shape tolerance and a performance error of each optical factor, a correction of the depth of focus is performed by the micro-actuator so that the optical signal can be maintained on the record layer in an optimum state by the sub-feedback servo circuit.

One example of a method for manufacturing an optical pickup head of an optical recording/reproducing apparatus includes: a first step of manufacturing a slider having a converging lens integrally formed at a central portion, a magnetic field-generating coil formed around the converging lens and an air-bearing surface formed at a lower surface, and an objective lens actuator for micro-actuating an objective lens for transmitting optical beam of a transmitting/receiving unit to the converging lens in an optical axial direction as components by using a micro-machining and a semiconductor device manufacturing process; a second step of aligning and bonding the slider and the objective lens actuator by using an alignment mark; and a third step of aligning the objective lens in the same optical axial direction as the converging lens.

Another example of the method for manufacturing an optical pickup head of an optical recording/reproducing apparatus includes: a first step of manufacturing a slider having a converging lens integrally formed at a central portion, a magnetic field-generating coil formed around the converging lens and an air-bearing surface formed at a lower surface, and an objective lens actuator for micro-actuating an objective lens for transmitting optical beam of a transmitting/receiving unit to the converging lens in an optical axial direction in a wafer form by using a micro-machining and a semiconductor device manufacturing process; a second step of aligning and bonding the slider and the objective lens actuator by using an alignment mark; a third step of cutting the bonded wafer to individual optical pickup head chips; and a fourth step of installing the objective lens and the converging lens to be aligned in an optical axial direction.

As for the alignment and bonding technique in the second step, if the substrate constituting the converging lens is a glass substrate containing an impurity such as sodium or the like, that is, for example, Pyrex #7740, a silicon substrate constituting the micro-actuator and an anodic bonding technique can be used.

As so far described, the optical pickup head of the optical recording/reproducing apparatus having the micro-actuator and its MANUFACTURING method of the present invention have the following advantage.

That is, a deflection generated between the record layer and the optical pickup head due to the error generated between a processing tolerance in manufacturing of an optical disk and in assembling and mounting, an error between the uneven thickness of the protection layer of the record layer of the disk and the smoothness of the disk surface, and an error according to an eccentricity and vibration of a rotational shaft of a spindle motor can be corrected, so that an optimum focus is made on the record layer of the disk.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical pickup head of an optical recording/reproducing apparatus having a micro-actuator, comprising:

a slider having a converging lens integrally formed at a central portion, a magnetic field-generating coil formed around the converging lens and an air-bearing surface formed at a lower surface; and an objective lens micro-actuator for micro-actuating an objective lens for transmitting an optical beam of a transmitting/receiving circuit to the converging lens in an optical axial direction, wherein the objective lens micro-actuator comprises:

a lower substrate positioned at an upper portion of the slider, the lower substrate having a mounting hole at a central portion and a plurality of lower fixed electrodes formed at regular intervals at an inner circumferential surface of the mounting hole;

an upper substrate installed at an upper side of the lower substrate, the upper substrate having a mounting hole at a central portion that substantially corresponds to a shape of the mounting hole in the lower substrate, and a plurality of upper fixed electrodes formed at regular intervals at an inner circumferential surface of the mounting hole;

an insulation layer interposed between the lower substrate and the upper substrate;

a moving substrate inserted in the mounting holes of the lower substrate and the upper substrate to be actuated in an optical axial direction, and having moving electrodes formed at an outer circumferential surface so as to be alternately arranged between the lower fixed electrodes and upper fixed electrodes;

a plurality of electrode pads for supplying power to the lower substrate, the upper substrate and the moving substrate in order to drive the moving substrate.

2. The optical pickup head of claim 1, wherein the slider is formed as a transparent material.

3. The optical pickup head of claim 1 further comprises:

an elastic member installed at the moving substrate in order to elastically return the moving substrate to its initial position.

4. The optical pickup head of claim 3, wherein the elastic member is a spring element.

5. The optical pickup head of claim 1, wherein an anti-refraction coating film is formed on the converging lens.

6. The optical pickup head of claim 1, wherein a protection layer or a lubrication layer is formed at the surface of the air-bearing surface.

* * * * *